June 14, 1960  H. C. CHAMBERLIN  2,940,351
MAGNETIC TAPE SOUND REPRODUCING MUSICAL INSTRUMENT
Filed Oct. 16, 1953  2 Sheets-Sheet 1

Harry C. Chamberlin,
INVENTOR.

BY
Attorney

June 14, 1960     H. C. CHAMBERLIN     2,940,351
MAGNETIC TAPE SOUND REPRODUCING MUSICAL INSTRUMENT
Filed Oct. 16, 1953     2 Sheets-Sheet 2
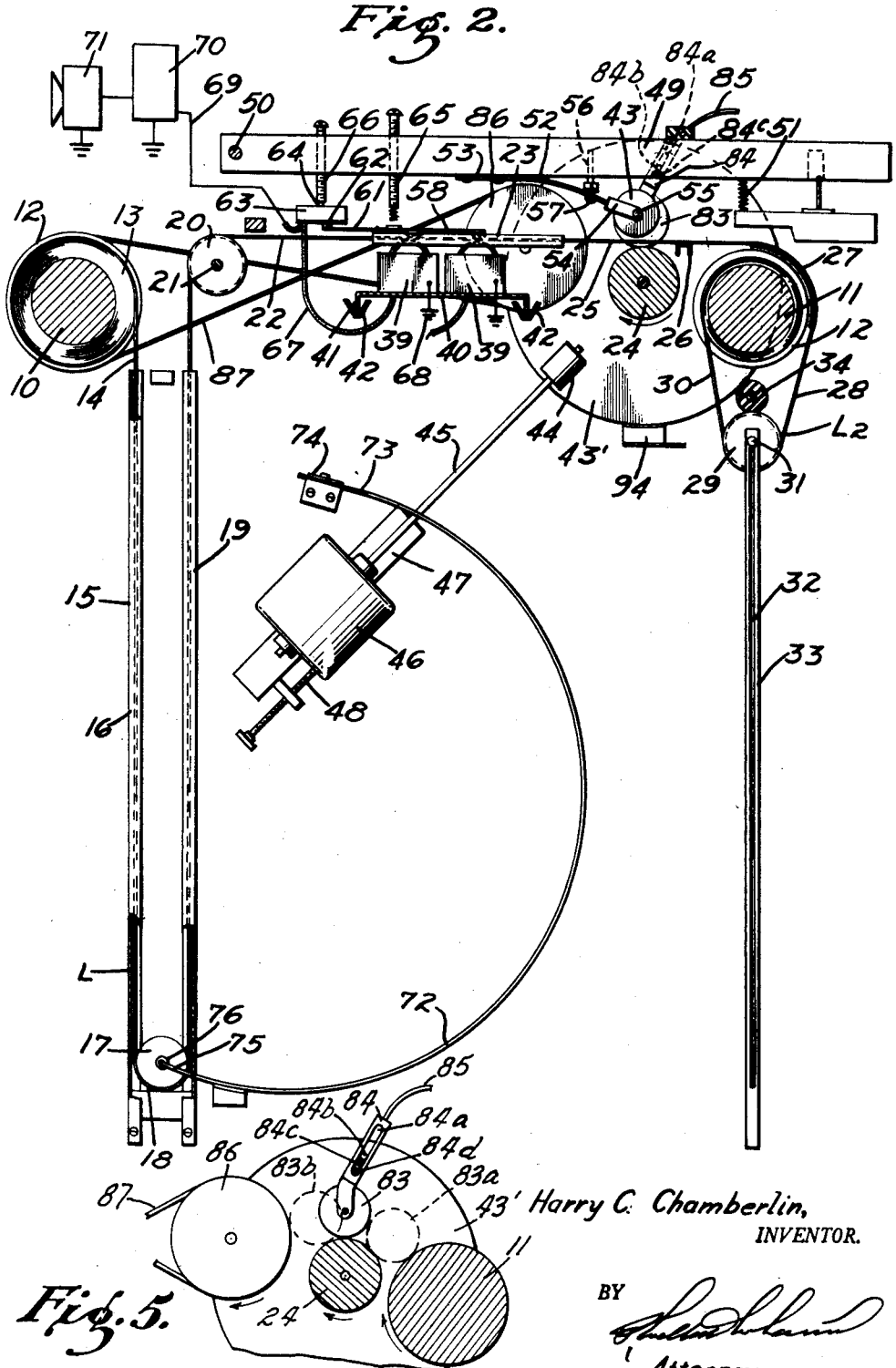
Harry C. Chamberlin,
INVENTOR.
BY 
Attorney United States Patent Office 2,940,351
Patented June 14, 1960

2,940,351

MAGNETIC TAPE SOUND REPRODUCING MUSICAL INSTRUMENT

Harry C. Chamberlin, 354 Winn Drive, Upland, Calif.

Filed Oct. 16, 1953, Ser. No. 386,459

14 Claims. (Cl. 84—1.28)

My invention relates in general to sound reproducing apparatus, and relates in particular to a device whereby any one of a plurality of selected sounds may be instantaneously and repeatedly reproduced.

Although my invention may be employed for the reproduction of a great variety of sounds, I have found that it is especially adapted for the reproduction of musical tones and sounds. In this application of my invention, the scale tones of any musical instrument may be selectively reproduced in response to the actuation of control members preferably in the form of keys which may be actuated by finger pressure. For example, by the selective pressing of keys, which may be arranged in the manner of piano or organ keys, the tones of a trombone may be selectively reproduced. Or, by a simple adjustment the operator may cause reproduction of musical tones of other instruments in response to selective operation of the keys.

It is an object of the invention to provide a sound reproducing device having a plurality of sound record members and simple means for selectively reproducing the sounds represented by the records carried by these members, in response to the operation of individual control members, wheich may be referred to as keys arranged to be directly actuated by finger pressure or remotely actuated by electromagnetic means.

A further object of the invention is to provide a sound reproducing device having a plurality of sound pickup heads and a plurality of sound record members adapted to be moved relatively to these heads, each of the record members being divided into a number of sections and each of the sections having thereon a sound track, there being means for adjusting the record member so that selected sections will be positioned in operative relation to the pickup heads, thereby making it possible to reproduce a wide variety of sounds by use of the device.

A further object of the invention is to provide a sound reproducing device wherein the record members consist of record tapes divided longitudinally and laterally into sound track carrying sections, there being means for adjusting the tapes so as to bring any selected set of sections into playing positions.

It is an object of the invention to provide a sound reproducing device which is compact and of relatively light weight so that it may be readily transported and yet is capable of reproducing a large number of sounds, including the notes of any one or all of the known musical instruments including guitar, piano, marimba, bells, drums or wind instruments. Also, it may be employed in the reproduction of true or realistic sound effects now requiring bulky and space-consuming equipment. For example, the musical tones reproduced are actual sounds obtained from the respective musical instruments. Likewise, sound effects, such as a knock at the door, firing of a shot, striking of a blow, the roar of waves against the shore, etc., are all actual sound reproductions.

Further objects and advantages of the invention may be brought out in the following part of the specification wherein I have described a simple embodiment of the invention in small detail for the purpose of limiting the scope of the invention which is set forth in the appended claims.

Referring to the drawings which are for illustrative purposes only:

Fig. 2 is a schematic sectional view embodying the structure of Fig. 1 taken as indicated by the line 2—2 of Fig. 1;

Fig. 5 is an enlarged schematic side view of the means for connecting tape carrying rollers or spools, respectively, with the power driven roller.

Figure 1:
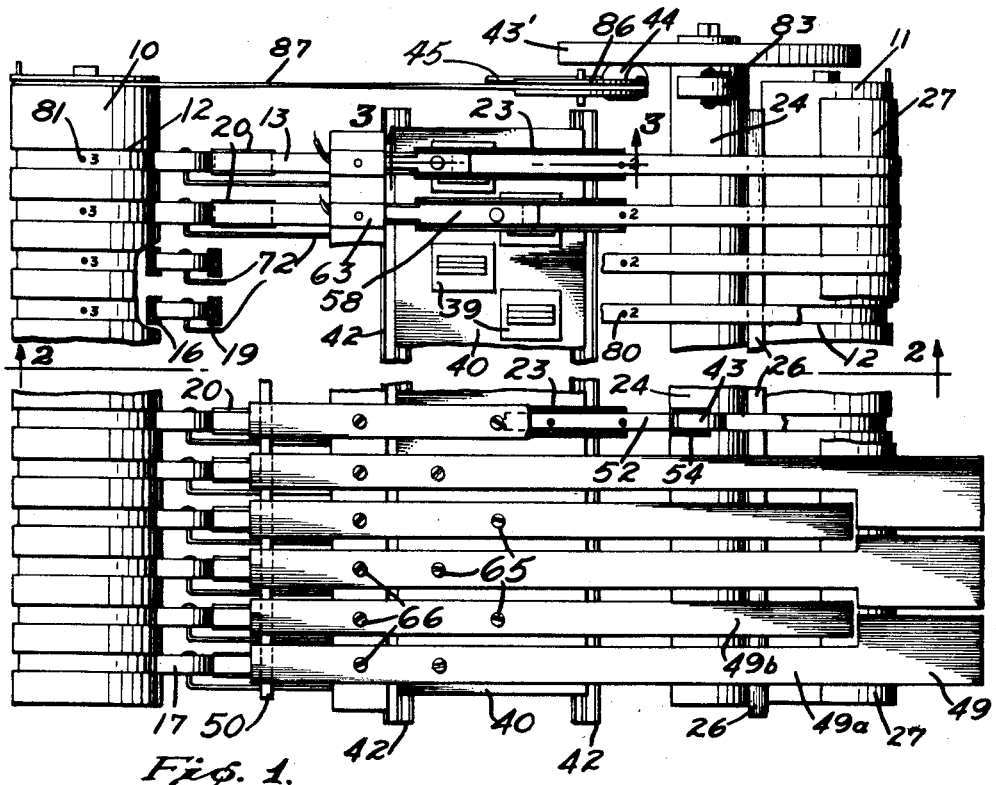
Fig. 1 is a fragmentary schematic plan view of a preferred form of the invention with portions broken away to more clearly show structures at various levels.

The invention has means for holding a plurality of sound records. In the preferred embodiment of the invention there are spaced spool means 10 and 11 comprising cylinders having side-by-side circumferential grooves or channels in which the opposite ends of sound record carrying tapes are secured, and in which these tapes are respectively wound. As best shown in Fig. 2, each tape has a portion 14 extending downwardly into a tape reservoir 15, each tape portion 14 extends down through a vertical guide 16, around a spool 17, as indicated at 18 and then up through a vertical guide 19 to an idler 20 turnable on a shaft 21 disposed in parallel relation to the axis of rotation of the spool means.

As further shown in Fig. 2 each tape extends rightwardly from its idler 20, as indicated at 22 through a guide 23, across the upper surface of a driving roller 24 as shown at 25 over a guide bar 26 and then over a supporting plate 27 which is curved around the upper righthand portion of the spool means 11, downwardly as indicated at 28 and under a small floating puller 29, the tape then continuing upwardly from the left side of the spool 29, as indicated at 30, to a channel 12 in the spool means 11, in which the rightward end of the tape is wound. Each floating pulley or spool 29 has stub shafts 31 extending into vertical slots 32 in guide members 33. The spools 29, when the sound reproducing device is inactive, are held against stops 34 consisting of small rubber rollers supported for rotation adjacent the upper ends of the guide members 33.

Figure 3:
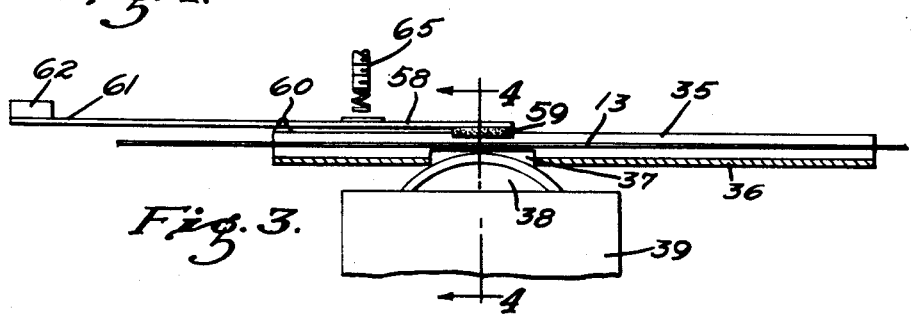
Fig. 3 is an enlarged fragmentary sectional view taken as indicated by the line 3—3 of Fig. 1.
Figure 4:
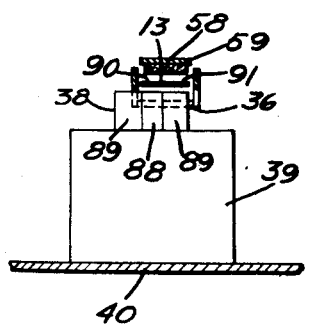
Fig. 4 is a fragmentary sectional view taken as indicated by the line 4—4 of Fig. 3.

Each tape guide 23 is in the form of a horizontal channel, as shown in Figs. 3 and 4, having side walls 35 supported in spaced relation by a bottom wall 36 and being provided with an opening 37 into which the upper portion 38 of a sound pickup head 39 extends. There is a sound pickup head under each tape portion which extends through a guide 23, and these pickup heads 39 are supported on a laterally shiftable member 40, shown as a plate having downwardly turned flanges 41 along the edges thereof which rests in laterally directed supporting channels 42. For moving the tapes 13 there is, as well shown in Fig. 2 a small roller 43 disposed above each tape portion 25 which passes over the upper face of the driving roller 24 which, when use of the sound producing device is desired, is maintained in continuous clockwise rotation by a drive means comprising a disc 43' fixed on one end of the roller 24 and arranged to be rotated in clockwise direction by a friction drive roller 44 mounted on a shaft 45 which extends from a power means consisting of an electric motor 46. The motor 46 is mounted on a guide 47 disposed radially of the axis of the disc 43', and an adjusting screw 48 is provided for shifting the motor and the driving roller 44 toward or away from the center of the disc 43', whereby the speed of rotation of the drive roller 24 may be varied. Downward bodily movement of the roller 43, Fig. 2, will force the portion 25 of the tape 13 which extends across the upper portion of the drive roller 24 down into engagement with the drive roller 24 so that the tape portion 25 will be frictionally engaged and moved rightwardly, causing the tape to move rightwardly with respect to the sound pickup head 39 over which it extends.

A feature of the invention is to provide an arrangement whereby driving engagement of the tape with the roller 24 is first effected, after which the tape will be brought into sliding engagement with the portion 38 of the pickup head 39 and then the circuit connecting the pickup head with an amplifier and loud speaker will be closed. By this arrangement I am enabled to set each tape in motion prior to the reproduction of a sound therefrom, thereby avoiding any slurring of the sound reproduction. Each engagement affecting roller 43 is associated with a member 49 for its actuation, such member being shown as a digitally operable key supported at its leftward end by a hinge pin 50 and at its rightward end by a spring 51. Each roller 43 is carried by a leaf spring 52, the leftward end 53 of which is secured to the lower face of the key 49 and the rightward end of which has thereon a fork 54 supporting shaft means 55 on which the roller 43 is rotatable. A screw 56, threaded upwardly into the key 49, and a nut 57 thereon, provide means engaging an intermediate portion of the spring 52 for flexing the spring upwardly and downwardly whereby vertical adjustment of the roller 43 with relation to the roller 24 is obtainable.

Above each tape portion extending through a guide 23 there is a leaf spring lever 58 which, as best shown in Fig. 3 carries a felt pad 59 in spaced relation to that portion of the tape 13 which extends across the upper portion 38 of the head 39. The intermediate portion of the lever 58 is supported on a hinge pin 60 and the leftward end 61 of the lever 58 extends, as shown in Figs. 2 and 3, under a horizontal stop 62. At the leftward end of the lever 58 there is a switch 63 having an upwardly projecting actuating pin 64. The key 49 is provided with adjustable means 65 for effecting downward swinging movement of the rightward end of the lever 58 so as to lower the pad 59 which will in turn move the tape 13 down into engagement with the portion 38 of the pickup head 39. The key 49 likewise carries adjustable means 66 for engaging the actuating pin 64 of the switch 63. The adjustable means 65 and 66 comprise screws which are threaded downwardly through the leftward portion of the key 49 in positions of alignment with the parts which they are to operate. As schematically shown in Fig. 1, each pickup 39 which, in the form of the invention disclosed, is of the magnetic type employed in tape recorders and sound reproducers, is connected to a switch by an electrical conductor 67 and is provided with a ground connection as indicated at 68. Each switch 63 is in turn connected through conductor means 69 with an amplifying unit 70 of sound reproducing equipment, this amplifier 70 being shown as connected in turn with the loud speaker 71. Equipment of this character is obtainable on the market for use with musical instruments and also forms a part of electric organ equipment.

It will be understood that there is a key 49 for each tape 13, and as shown in Fig. 1, these keys 49 as indicated at 49a and 49b are arranged in side-by-side relation in the manner of piano keys, so as to represent the half-tones of the commonly used musical scale. Also, the tones carried by the tapes under these keys represent and have the same pitch as these same half-tones. Therefore, the invention makes it possible for any person capable of playing the piano to reproduce, in pitch corresponding to the tones of the piano, the tones of other instruments on which he may not be a skilled performer. It will be understood that with each key 49 there is associated a tape guide 23, pickup head 39 and switch 63. Ahead of each tape guide 23 there is a tape reservoir 15 wherein a loop L of the tape 13 is maintained by the action of a curved wire spring 72 having one end 73 thereof secured by bracket 74 and having the opposite end 75 thereof engaging the bearing 76 which supports the roller or spool 17. The action of the spring 72 on the roller 17 is to pull a portion of the tape 13 down into the reservoir 15, the result being that the portion 22 of the tape which extends rightwardly from the idler 20 is pulled leftwardly and the loop L2 of the tape which extends down and under the floating pulley 29, is reduced to its smallest size, as shown in Fig. 2. When the engagement-effecting roller 43 is raised, the tension in the tape produced by the spring 72 and the spool 17 will pull tape from the loop L2 and raise the relatively light floating pulley 29 to its raised position against the stop 34.

With the driving roller 24 in rotation, downward movement of the key 49, Fig. 2, will effect downward movement of the roller 43 to press the portion 25 of the tape 13 into engagement with the roller 24 which will then motivate the portion 25 rightwardly so as to pull the tape from the loop L and feed the same into the loop L2. Immediately following the start of the movement of the tape in rightward direction, the screw 65 will force the lever 58 downwardly so that the pad 59 will move the tape, Fig. 1, into the portion 38 of the associated pickup head 39, and the downward movement of the screw 65 will actuate the associated switch 63 to connect the electronic sound reproducing equipment with the pickup with the result that the sound of the vibrations recorded on the tape will be omitted from the speaker 71. When finger pressure is released from the key 49 the roller 43 will be raised and the driving effect of the roller 24 discontinued, so that the spring 72 acting through the roller 17 will substantially instantaneously return the tape from the loop L2 to the first loop L. This return of the tape to its initial position is very rapid, making possible a very rapid repetition of the tone recorded on the tape, by repeated operation of the key 49.

Referring to Fig. 1, it will be observed that the tapes 13 have section indicating marks 80 thereon which are located at the front or rightward ends of the guides 23.

Also, each tape 13 has marks 81 spaced leftwardly from the marks 80 beyond the portions 14, Fig. 2, of the tapes 13, constituting the front ends of the loops L. In this manner the tape is divided longitudinally into sections. For example, the marks 80 have numeral 2 associated therewith and the marks 81 have the numeral 3 adjacent thereto. This means that the portions of the tape extending leftwardly from the marks 2 are the second sections and that the portions of the tapes extending leftwardly from the marks 3 and being wound on the spool means 10 are the third longitudinal sections of the tapes 13. Means are provided for rotating the spool means 11 in clockwise direction so as to shift all of the tapes 13 rightwardly and thereby wind section 2 of the tapes onto the spool means 11 and shift sections 3 of the tape into playing position. This rotation of the spool means 11 in clockwise direction is continued until the marks 3 are brought into the starting position at present occupied by the marks 2, Fig. 1. For this purpose, an idling roller 83 is rotatably mounted on the lower end of a lever 84 provided with a handle 85. The handle 84 is provided with a longitudinally extending slot 84a in which is slidably disposed a pivot pin 84b supported by any suitable fixed support and there is a spring 84c reacting between the pin 84b and the lower end 84d of the slot to urge the lever downwardly. By counterclockwise movement of the handle 85 it is possible to move the idler roller 83 rightwardly and downwardly from the position in which it is shown in solid lines to the dotted line position shown at 83a so that it will engage the ends of the spool means 11 and the roller 24 to transmit rotation from the roller 24 to the spool means 11. On the opposite side of the roller 24 from the spool means 11 there is a wheel 86 adapted to drive the spool means 10 through a cross belt 87. Clockwise movement of the handle 85 will carry the idler roller 83 leftwardly from the position in which it is shown in solid lines in Fig. 2 in a position to engage both the roller 24 and the wheel 86, as shown in dotted lines 83b. This will drive the wheel 86 in clockwise direction so that the cross belt 87 will in turn drive the spool means in counterclockwise direction, when it is desired to shift all of the tapes leftwardly to bring other sections into playing position with relation to the pickup heads 39. For example, the tapes 13 may be thereby shifted leftwardly from the positions in which they are shown in Fig. 1 to bring the first sections of the tape, while lie to the right of the marks 2 into playing position.

The longitudinally arranged section of the tapes referred to in the foregoing are laterally divided into sections. For example, each tape section may have two sound records, one along each edge thereof.

As shown in Fig. 4, the upwardly extending portion 38 of each head 39 comprises a central magnetic core 88 disposed between two brass tape supports 89. When the supporting member 40 is in one of its extreme lateral positions, the magnetic pickup core 88 will lie under an edge section 90 of the tape 13 so that the sound record contained on one edge portion of the plate may be played. When the supporting member 40 is shifted to its other extreme position, all of the pickup heads 39 will be shifted and each of them will be brought into a position to pick up the magnetic sound record carried by the opposite edge 91 of the tape.

A further feature of the invention resides in the provision of a brake 94 arranged to be brought into engagement with the periphery of the disc 43', thereby making it possible to intermittently reduce the speed of rotation of the drive roller 24 so that an uneven forward movement will be transmitted to the tape 13 to produce a fluctuating sound effect.

I claim:

1. In a sound reproducing device: a plurality of sound pickup heads; a plurality of record tapes each having a sound track thereon; power driven means for moving said tapes forwardly so that the sound tracks thereof will move relative to said pickup heads; control means for effecting operation of said power driven means to move said tapes forwardly, said control means including a plurality of keys adapted to be respectively actuated when reproduction of sound selectively from said tapes is desired; reversing means for moving said tapes in reverse direction; and means acting upon release of said keys to effectuate said reversing means so as to return said tapes respectively to their starting positions.

2. In a sound reproducing device: a plurality of sound pickup heads; a plurality of record tapes each having a sound track thereon provided with a starting point in a starting position when the tape is stationary; power driven means for moving said tapes forwardly so that the sound tracks thereof will move relative to said pickup heads; control means for effecting operation of said power driven means to move said tapes forwardly, said control means including a plurality of keys adapted to be respectively actuated when reproduction of sound selectively from said tapes is desired; and spring means acting substantially instantaneously upon release of said keys to reverse said tapes respectively to the starting positions thereof.

3. In a sound reproducing device: a plurality of sound pickup heads; a plurality of record tapes each having a sound track, each of said tracks being arranged across one of said heads; means for forming first loops in said tapes ahead of said heads; means for forming second loops in said tapes following said heads; motivating means for each of said tapes operative to move it from its first loop across one of said heads to its second loop; key-controlled means for selectively actuating said motivating means; and reversing means for returning said tapes to said first loops thereof after they have been moved by said motivating means into said second loops thereof.

4. In a sound reproducing device: a plurality of sound pickup heads; a plurality of record tapes each having a sound track, each of said tracks being arranged across one of said heads; means for forming first loops in said tapes ahead of said heads; means for forming second loops in said tapes following said heads; motivating means for each of said tapes operative to move it from its first loop across one of said heads to its second loop; key-controlled means for selectively actuating said motivating means; and spring means operating instantaneously upon release of said key-controlled means to reverse said tapes to said first loops thereof.

5. In a sound reproducing device: a plurality of sound pickup heads; a plurality of record tapes each having a plurality of sound tracks thereon, each of said tracks being arranged across one of said heads; adjusting means for shifting said tapes so that different sound tracks thereon will be brought respectively into operative relation to said heads; means for forming first loops in said tapes ahead of said heads; means for forming second loops in said tapes following said heads; motivating means for each of said tapes operative to move it from its first loop across one of said heads to its second loop; key-controlled means for selectively actuating said motivating means; and reversing means for returning said tapes to said first loops thereof after they have been moved by said motivating means into said second loops thereof.

6. In a sound reproducing device: a plurality of pickup heads; a plurality of record tapes extending respectively across said heads, said tapes having thereon records of different tones from a selected sound producing instrument, each of said records having a definite starting point disposed initially in a starting position; power driven means operative selectively to move said tapes across said heads whereby selected tones of said sound producing instrument may be reproduced; and means operative upon discontinuance of the operation of said power driven means to move said tape so as to bring said starting point again into said starting position.

7. In a sound reproducing device: a sound pickup head; a record member having a sound track with a starting point in a starting position; power driven means for moving said record member so that the sound track thereof will move relative to said pickup head; control means for effecting operation of said power driven means to move said record member forwardly, said control means including a key adapted to be actuated when reproduction of sound from said record member is desired; and means acting upon release of said key to return said record member to its starting position.

8. In a sound reproducing device: a sound pickup head; a record member having a sound track having a starting point in a starting position; power driven means for moving said record member so that the sound track thereof will move relative to said pickup head; control means for effecting operation of said power driven means to move said record member forwardly, said control means including a key adapted to be actuated when reproduction of sound from said record member is desired; and spring means acting substantially instantaneously upon release of said key to return said record member to its starting position.

9. In a sound reproducing device: a sound pickup head; a record tape having a sound track; power driven means for moving said record tape so that the sound track thereof will move relative to said pickup head; control means for effecting operation of said power driven means to move said record tape forwardly, said control means including a key adapted to be actuated when reproduction of sound from said record tape is desired; reversing means acting upon release of said key to return said record tape to its starting position; and brake means for selectively varying the speed of movement of said tape.

10. In a sound reproducing device: a sound pickup head; a record tape having a sound track; power driven means for moving said record tape so that the sound track thereof will move relative to said pickup head; control means for effecting operation of said power driven means to move said record tape forwardly, said control means including a key adapted to be actuated when reproduction of sound from said record tape is desired; and spring means resisting movement of said tape by said power driven means and acting substantially instantaneously upon release of said key to return said record tape to its starting position.

11. In a sound reproducing device: a sound pickup head; a record tape having a sound track; power driven means for moving one edge of said record tape so that the sound track thereof will move relative to said pickup head; means operative to relatively shift said tape and said head laterally so that the other edge of the tape will be movable along said pickup head; control means for effecting operation of said power driven means to move said record tape forwardly, said control means including a key adapted to be actuated when reproduction of sound from said record tape is desired; and means acting upon release of said key to return said record tape to its starting position.

12. In a sound reproducing device: a sound pickup head; a record tape having a sound track; power driven means for moving one edge of said record tape so that the sound track thereof will move relative to said pickup head; means operative to relatively shift said tape and said head laterally so that the other edge of the tape will be movable along said pickup head; control means for effecting operation of said power driven means to move said record tape forwardly, said control means including a key adapted to be actuated when reproduction of sound from said record tape is desired; and spring means resisting movement of said tape by said power driven means and acting substantially instantaneously upon release of said key to return said record tape to its starting position.

13. In a sound reproducing device: a sound pickup head; a record member having a sound track; power driven means for moving said record member so that the sound track thereof will move relative to said pickup head; control means for effecting operation of said power driven means to move said record member forwardly, said control means including a key adapted to be actuated when reproduction of sound from said record member is desired; means acting upon release of said key to return said record member to its starting position; and means operative to effect a small variation of the speed of said record member while it is in motion.

14. In a sound reproducing device: a sound pickup head; a record tape having longitudinally arranged sections, each of said sections having a sound track; adjusting means operative to shift said tape longitudinally so that any selected section thereof may be brought into a position with the sound track thereof in a starting position relative to said pickup head; power driven means for moving said record tape so that the selected sound track thereof will move relative to said pickup head; control means for effecting operation of said power driven means to move said record tape forwardly, said control means including a key adapted to be actuated when reproduction of sound from said record tape is desired; and means acting upon release of said key to return said record tape to its starting position.

References Cited in the file of this patent

UNITED STATES PATENTS

| | | |
|---|---|---|
| 1,817,704 | Osborne | Aug. 4, 1931 |
| 1,998,461 | Kucher | Apr. 23, 1935 |
| 2,499,573 | Dunn | Mar. 7, 1950 |
| 2,544,722 | Pattyn | Mar. 13, 1951 |
| 2,549,145 | Vagtborg | Apr. 17, 1951 |
| 2,645,969 | Daniel | July 21, 1953 |
| 2,667,097 | Scheaffer | Jan. 26, 1954 |
| 2,737,840 | Gratian | Mar. 13, 1956 |

UNITED STATES PATENT OFFICE

CERTIFICATE OF CORRECTION

Patent No. 2,940,351　　　　　　　　　　　　　　　June 14, 1960

Harry C. Chamberlin

It is hereby certified that error appears in the printed specification of the above numbered patent requiring correction and that the said Letters Patent should read as corrected below.

Column 1, line 38, for "wheich" read -- which --; column 2, line 39, for "puller" read -- pulley --; column 5, line 17, for "while" read -- which --; column 8, line 40, list of References Cited, for "Scheaffer" read -- Schaeffer --.

Signed and sealed this 29th day of November 1960.

(SEAL)
Attest:

KARL H. AXLINE
Attesting Officer

ROBERT C. WATSON
Commissioner of Patents